(12) United States Patent
Rajendran

(10) Patent No.: US 8,188,727 B2
(45) Date of Patent: May 29, 2012

(54) HUB MOUNTABLE SPEED SENSING DEVICE

(75) Inventor: Ponnappan Rajendran, Thudiyalur (IN)

(73) Assignee: Pricol Limited, Tamil Nadu (IN)

( * ) Notice: Subject to any disclaimer, the term of this patent is extended or adjusted under 35 U.S.C. 154(b) by 628 days.

(21) Appl. No.: 12/309,653

(22) PCT Filed: Jun. 21, 2007

(86) PCT No.: PCT/IN2007/000246
§ 371 (c)(1),
(2), (4) Date: Jul. 9, 2009

(87) PCT Pub. No.: WO2008/012835
PCT Pub. Date: Jan. 31, 2008

(65) Prior Publication Data
US 2010/0072983 A1    Mar. 25, 2010

(30) Foreign Application Priority Data
Jul. 25, 2006    (IN) .............. 1284/CHE/2006

(51) Int. Cl.
*G01P 3/48*    (2006.01)

(52) U.S. Cl. ...................................... 324/166
(58) Field of Classification Search ............... None
See application file for complete search history.

(56) References Cited

U.S. PATENT DOCUMENTS 7,439,733 B2 * 10/2008 Arns et al. ............ 324/207.25
7,615,994 B2 * 11/2009 Butzmann ............ 324/207.25

* cited by examiner

*Primary Examiner* — Melissa Koval
*Assistant Examiner* — Trung Nguyen
(74) *Attorney, Agent, or Firm* — Alix, Yale & Ristas, LLP

(57) ABSTRACT

A hub mountable speed sensing device comprising a housing, a metallic tubular insert adapted to be press-fitted with respect to the housing, a stationary speed sensing probe comprising a magnetic conversion device having a bias magnet and adapted to be inserted into the housing in close proximity to the rotating member having sensing teeth along its axis made of ferrous material, a locking arrangement provided to prevent the detection probe from dislodging from the housing, and wherein the bias magnet is adapted to generate magnetic flux which is interrupted by the rotor tooth while rotating the magnetic conversion device providing for speed sensing biased on the change in flux density.

16 Claims, 3 Drawing Sheets

Figure 1:
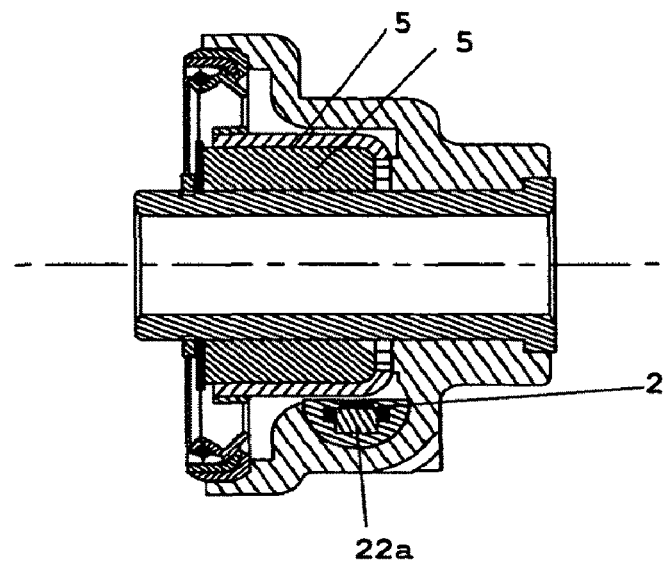

Figure 3:
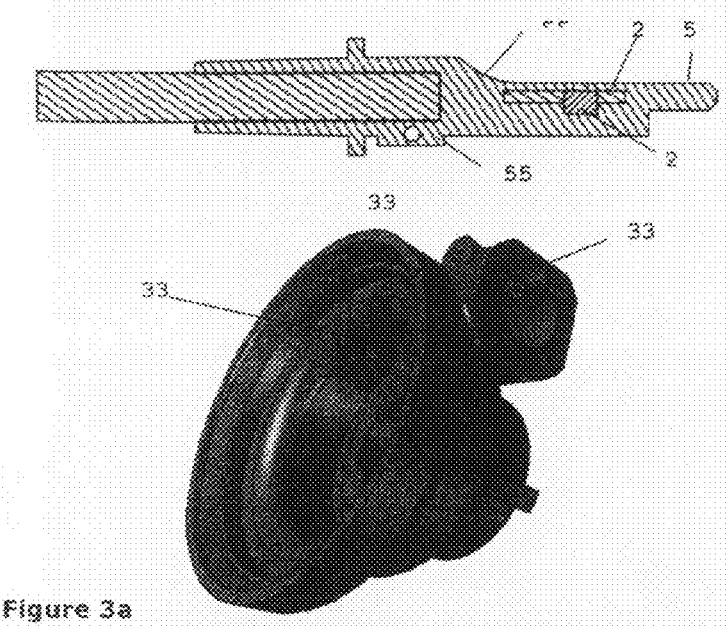
Figure 3a
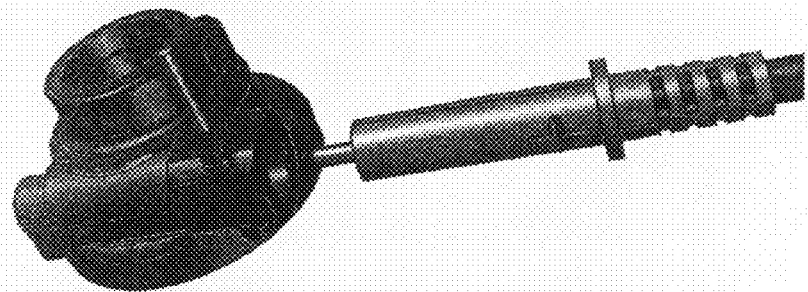
Figure 3b

HUB MOUNTABLE SPEED SENSING DEVICE

FIELD OF THE INVENTION

The present invention relates to a wheel hub mountable speed sensing device and in particular to such wheel hub mountable speed sensing device which would provide better magnetic detection involving Hall ICs and importantly would also be simple and cost-effective to obtain and would serve for multi-product hub, mountable speed sensing. Advantageously, the speed sensing device of the invention is adapted for simple and easy mounting with respect to the hub housing which would not only be effective for proper installation for the purpose speed sensing but would also favour simple and easy release of the sensor/probe for required inspection or replacement. The hub mountable speed sensing device of the invention is thus directed to serve the diverse and complex requirements of effective magnetic response base speed sensing of automobiles and the like.

BACKGROUND ART

In recent years, demands for the cost reduction of the rotation detectors that are applied to the two-wheeled vehicles are increasing. Accordingly, there is a tendency in which the rotation detecting portions are switched from the magnetic detecting elements such as Hall ICs and so on to cheaper magnetic responsive elements such as reed switches or the like.

A known rotation detection devices includes a sensor for detecting a rotation speed of vehicle wheels. The sensor for detecting the rotation speed of the vehicle wheel is provided relative to an outer race rotatably supporting a hub unitary rotating with the wheel. Here the moulding has to be performed after determining positions of the cover member and a body of the sensor relative to a moulding type for the insert moulding. Because the different sizes and the different configurations of the cover member require different dies, the construction of the known rotation detection sensor is not efficient for multi-product production. Thus there exists for a rotation device which is applicable to cover members with different sizes and configurations.

Other known prior art rotation detector in a two-wheeled vehicle are formed by disposing a magnetic detecting element and a magnet, both of which are mounted on a circuit board, to a substantially cylindrical resin case having a detection surface for detecting a detecting object. The rotation detector is attached to a mission case or a sprocket cover and a tooth point. When a tooth point of a mission gear or sprocket is detected with such the rotation detector as a detecting object, since there is a little clearance in the detecting object, the object is caused to vibrate owing to a body stiffness, an engine displacement or the like of a vehicle (two-wheeled vehicle), and a detection position gap between the detecting object and the rotation detector may result in fluctuating. This generates a magnetic fluctuation in the rotation detector and resultantly becomes detection noise. Accordingly, there is a problem in that an indicator for displaying, for instance, a speed corresponding to an output data that is output from the rotation detector may wrongly operate.

Further, the shape and the size of the object for detection are varied according to the kind of vehicle and therefore, it is necessary to adjust the gap for detection between the object for detection and the rotation detector which complicates the integrating operation performance.

Other rotors as described in the prior arts is made our of plastic resin magnet material (Plasto ferrite) and radially magnetized with plurality of poles and mounted on the metal tubular insert. The rotor is inserted into the slots of the hub so that it gets rotated as the hub rotates that is the rotors is synchronized with wheel rotation. The "Magnetic detecting portion" or "Magnetic detecting devise" or "Magnetic conversion element" which is inserted into the hosing comprises reed switch, hall Ics, MR elements or like and electronic circuit to detect the change in magnetic poles of the above said rotor as it rotates.

Prior art also describes rotors that is mounted on a tubular metal insert and rotor's lateral movement is arrested at one side only by the housing wall, but on the other side no such arrangements provided. It is feared that the rotor may falls out from the housing during vehicle assembly or in the field during vehicle service.

The prior art also describes a Circuit board which comprises of predetermined wiring pattern and a "Magnetic detecting portion" or "Magnetic detecting devise" or "Magnetic conversion element" and electronic components and like are electrically connected and fixed by soldering, also with a wire cord to connect with source. Said circuit board along with wire cord is inserted into a groove provided in housing and sealed with a sealing member of epoxy or like. Sealing with epoxy is time consuming and laborious operation. Also handling of circuit board during the manufacturing is difficult as the wire strands soldered with Circuit board will get disturbed and may lead to broken of electrical connection between wires and circuit board. Also rectification of non-functional product is very difficult during manufacturing as the circuit board sealed with epoxy, which is difficult to remove.

In the other existing devices, it is not possible to exchange the circuit board with "Magnetic detecting portion" or "Magnetic detecting devise" or "Magnetic conversion element" in case of malfunctioning or failure of the electronic parts or the wire cord, which is more likely to get damaged during wheel removing or in the field use. One has to replace the complete set of the speed-sensing device in case of above explained situation as the detecting devise is sealed with epoxy, which cannot be serviceable in the field.

The prior art describes about the tubular portion is insert molded with Housing. As the insert molding operation is having low yield of manufacturing thus cost of the product will be significantly high.

There are some related prior patents which include U.S. Pat. No. 6,400,135 which discloses a mounting for a wheel-revolution sensor in the wheel support of a motor vehicle for scanning a revolving pole ring on a wheel comprises an insert which passes through a bore in the wheel support which receives the sensor in an ideal position with respect to the pole ring. Importantly, this prior art relates to inductive type sensor mounted inside a hole in the wheel mounting base and in particular on a plastic housing over the axle of a vehicle wheel. U.S. Pat. No. 6,422,657 is directed to an improved vehicle wheel hub mounting system includes a wheel hub, an axle spindle, a bearing assembly, and a threaded fastener. This invention describes about the mounting arrangement of a Vehicle wheel. U.S. Pat. No. 5,544,962 is again directed to the wheel bearing with arrangement for speed sensor. U.S. Pat. No. 4,075,520 describes about the method of mounting of a speed sensor. A tubular housing with internal snap lock arrangement provided to hold the sensor. U.S. Pat. No. 6,155,114 is directed to the packaging and processing method of a speed sensor. In U.S. Pat. No. 5,920,193 only method of fixing a speed sensor with wheel bearing dust cap for Four wheeler application is taught. Further, WO 00 218878 and WO 9749995 provides for speed sensors which are limited in application and are suitable only for four wheeler applications.

Based on the above state of the art, it is now desirable to provide a Speed Governor for automobiles which will avoid the problems/disadvantages noted above and overcome other problems encountered in conventional speed sensor devices/ methods.

OBJECTS OF THE INVENTION

It is thus the basic object of the present invention to provide wheel hub mountable speed sensing device which would avoid the limitations and/or complexities of the presently available hub-mountable sensing devices by way of selective disposition of the sensing probe in relation to the rotor having sensing teeth for effective magnetic response based detection of speed and also providing simplicity and ease of application and maintenance of such speed sensor.

Another object of the present invention is directed to selective provision of co-operative elements of wheel hub mountable speed sensing device which would be obtain of selective combination of materials to facilitate the manufacture, application and in the process provide required user friendly characteristics to such hub mountable speed sensing devices.

A further object of the present invention is directed to provide for a speed sensing or rotation detection device for automobiles involving bias magnet to produce magnetic flux interrupted by rotor tooth while rotating and a conversion device adapted to convert the change in flux density into a digital pulse.

Yet further object of the present invention is directed to provide for speed sensing and rotation detection device which is hub mountable and also involve effective locking arrangement for its proper assembling and use to generate required magnetic response based speed sensing in automobiles.

A further object of the present invention is directed to a hub mountable speed sensing device which is directed to reduce the process time and cost and lead to excellent productivity by avoiding complex and time consuming processes like filling of epoxy and by way of over molded probe means adapted for easy removal for inspection and replacement.

A further object of the present invention is directed to hub mountable speed sensing device which would facilitate molding of the housing as a separate component whereby the productivity can be increased and the cost of the components involved could be reduced thereby facilitating wide scale manufacture and use of the speed sensor device of the invention.

SUMMARY OF THE INVENTION

Thus according to the basic aspect of the invention there is provided a hub mountable speed sensing device comprising:
a housing;
a metallic tubular insert adapted to be press fitted with respect to said housing;
a stationary speed sensing/rotation detection probe comprising a magnetic conversion device having a bias magnet and adapted to be inserted into the housing in close proximity to a rotating member having sensing teeth along its axis made of ferrous material;
a locking arrangement provided to prevent the said detection probe from dislodging from said housing; and
wherein the said bias magnet is adapted to generate magnetic flux which is interrupted by the rotor tooth while rotating and said magnetic conversion device providing for speed sensing based on the change in flux density.

According to another aspect of the invention there is provided a hub mountable speed sensing device comprising:
a housing;
a metallic tubular insert adapted to be press fitted with respect to said housing;
a stationary speed sensing/rotation detection probe comprising a magnetic conversion device having a bias magnet and adapted to be inserted into the housing in close proximity to a rotating member having sensing teeth along its axis made of ferrous material;
wherein the said bias magnet is adapted to generate magnetic flux which is interrupted by the rotor tooth while rotating and said magnetic conversion device providing for speed sensing based on the change in flux density; and
the said probe is over molded and fixed with housing and locked with a dowel pin or light tension pin to on one hand prevent dislodging from the housing and also favour easy removal for inspection and/or replacement.

Advantageously, in the above device of the invention the said locking arrangement comprise a groove provided on the tubular metal insert at the hub side and said rotor is inserted on the said tubular insert fitted with a locking device preferably selected from Circlip, Snap ring, Push on lock washer and the like such that the hub side movement of said rotor is arrested during shipment time itself.

The bias magnet is preferably fixed by means of adhesive or an additional small housing made out of plastic resin which is moulded with a thermo plastic elastomer (TPE) or PVC or like material.

Importantly, the over molding material provides total watertight sealing for the circuit board. The said over molded portion is having a pilot guide pin on front side inserted into the said guide hole and a rectangular projection provided on the body sides into the key way slot on the housing, a dowel pin or Light tension pin is press fitted into the circular hole after making a pilot drilling operation, which provides for a recess on the rectangular portion of over molded probe, the said dowel pin or light tension pin adapted to prevent the over molded probe dislodging from the housing.

Also, the over molded probe fixed with housing and locked with a dowel pin or light tension pin is adapted for easy removal for inspection and/or replacement.

Advantageously, in the device of the invention, the housing is molded as a separate component with out the metallic tubular insert and the tubular insert press fitted in a water-tight manner with housing In accordance with a preferred aspect of the invention in the hub mountable speed sensing device comprises a circular opening along with a Key way slot provided on the housing and axis of the circular opening aligned such a way to position the Hall IC or the like tangentially to said rotor. Also a guide hole coaxially aligned to above said circular opening is provided for correct alignment of over molded probe along the radial direction, said Key way slot of the circular opening providing for over molded probe alignment in axial direction. The circular hole is provided near the Key way slot and the hole axis is nearly perpendicular or slightly tilted from the perpendicular axis.

The rotor used in the device is preferably made of plastic resin material more preferably nylon, Polyoxymethylene or like materials.

Advantageously, the Magnetic conversion devise converts the change in flux density into a digital pulse. The magnetic conversion device thus comprises of Hall Ics and said bipolar bias magnet preferably selectively made of NdFeb Samarium cobalt or similar magnetic material.

Moreover, in said speed sensing or rotation detection device the magnet is positioned behind the sensing face of Hall ICs.

The details of the invention its objects and advantages are explaining hereunder in greater details in relation to non-limiting exemplary illustration as per the following accompanying figures:

BRIEF DESCRIPTIONS OF THE ACCOMPANYING FIGURES

Figure 2:
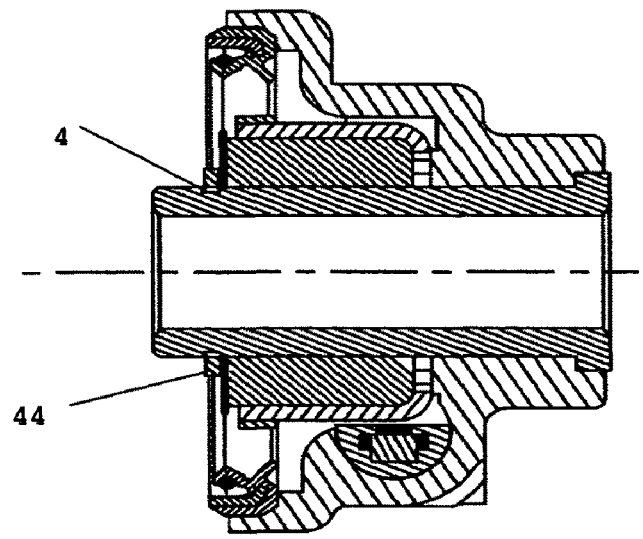
Figure 4:
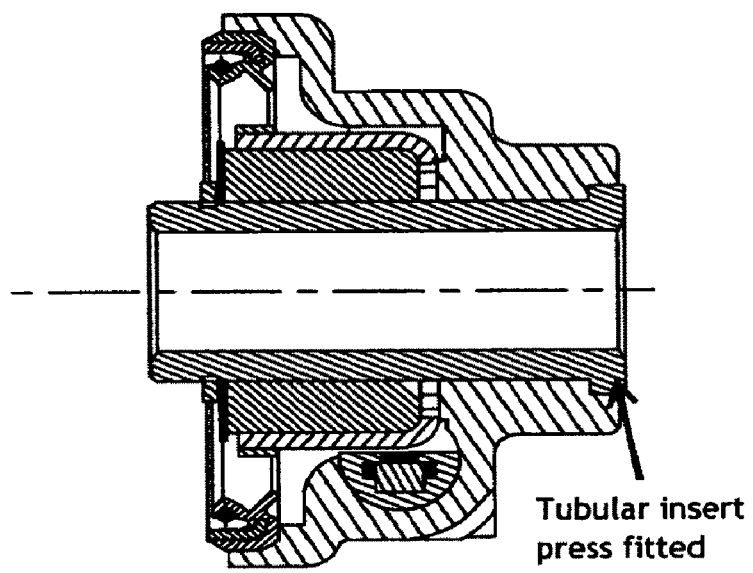

FIG. 1: is an illustration of the hub mountable speed sensing device of the invention involving a rotor comprising a rotating ferrous material ring;

FIG. 2: illustrates the locking arrangement to prevent dislodging of the rotor from the assembly of the hub mountable speed sensing device of the invention;

FIG. 3: illustrates the over molding on magnetic detection portion along with the arrangement for easy removal of the magnetic detection device;

FIG. 4: is an illustration of the tubular insert press fitted with respect to the housing in the hub mountable speed sensing device of the invention.

DETAILED DESCRIPTION OF THE ACCOMPANYING FIGURES

Reference is first invited to accompanying FIG. 1 which illustrates by way of sectional illustration the provision of the tubular insert (1) adapted to be press fitted with respect to the housing. Importantly, the figure further illustrates the provision of circlip (2, 2a) and a snap ring provided to arrest the hub side movement of the rotor (5).

In accompanying FIG. 2, the locking arrangement is illustrated in greater details. In particular, such a locking arrangement involves a key inserted in slot to prevent dislodging of rotor from the housing assembly, providing a groove on the tubular metal insert at the hub side and said rotor being inserted in said tubular insert.

Reference is now invited to accompanying FIG. 3 which shows the circular opening along with a key way to mount the magnetic detection device tangentially to the rotor. As also apparent from figure the portion marked 3a shows the over molding on the magnetic detection portion providing total water tight sealing and having co-axial guide hole for correct alignment of the over molded probe along the radial direction. The portion marked 3b in the accompanying figure illustrates the magnetic detection device and its easy mounting on to the over molded housing and fixing provision by locking with a dowel pin press fitted with a hole obtained by pilot drilling.

FIG. 4: is a clear illustration similar to FIG. 1 which shows the provision of the press fitted tubular insert provided in the hub mountable speed sensing device of the invention.

One or more of the problems of the conventional prior art are thus overcome by various embodiments of the present invention, as discussed above. As shown in the said accompanying figures, the present invention relates a wheel hub mountable speed sensing device having stationary magnet sensing element and a rotating member with sensing teeth made out of ferrous material.

Importantly as shown in the figures, the speed sensing or rotation detection device the insert is moulded with a toothed ferrous material insert made out of deep drawn quality sheet metal, which will have plurality of teeth. More importantly, the teeth are positioned along the axis of the rotor.

The speed sensing or rotation detection device is adapted to be placed into the housing in proximity to the rotor. The said bias magnet produces a magnetic flux, which is interrupted by the rotor tooth while rotating and the Magnetic conversion devise converts the change in flux density into a digital pulses.

As also apparent from the figures, a locking arrangement comprises a groove provided on the tubular metal insert at the hub side and said rotor is inserted on the said tubular insert fitted with a locking device such as Circlip, Snap ring, Push on lock washer or like, so that the hub side movement of said rotor is arrested during shipment time itself.

Thus the invention provides for a speed sensing or rotation detection device which reduces the process time and cost and leads to excellent productivity. This is achieved by eliminating the filling of epoxy, wherein in the present invention the circuit board comprises of the said components and additionally a bias magnet fixed by means of adhesive or an additional small hosing made out of plastic resin which is moulded with a thermo plastic elastomer (TPE) or PVC or like material. The over molding material provides total watertight sealing for the circuit board. A circular opening along with a Key way slot provided on the housing and axis of the circular opening aligned such a way to position the Hall IC or the like tangentially to said rotor. Also a guide hole coaxially aligned to above said circular opening is provided for correct alignment of over molded probe along the radial direction. Key way slot of the circular opening take care of over molded probe alignment in axial direction. A circular hole provided near the Key way slot and the hole axis is nearly perpendicular or slightly tilted from the perpendicular axis. The over molded portion is having a pilot guide pin on front side inserted into the said guide hole and a rectangular projection provided on the body slides into the key way slot on the housing. A dowel pin or Light tension pin is press fitted into the circular hole after making a pilot drilling operation, which makes a recess on the rectangular portion of over molded probe. The said dowel pin or light tension pin prevents the over molded probe dislodging from the housing. Thus the present invention eliminates the filling of epoxy and they by reducing the process time and cost and leads to excellent productivity.

Importantly, the over molded probe is fixed with housing and locked with a dowel pin or light tension pin which can be removed easily by simple tool like a straight rod or a specially made device. As the dowel pin or light tension pin is removed the defective or damaged over molded probe can be extracted from the housing and a new working over molded probe can be fitted with the existing housing.

In accordance with the invention it is possible to mold the hosing as a separate component with out the metallic tubular insert and the tubular insert press fitted with housing. An adhesive and sealing agent applied over the fitment area of the tubular insert for water tightness. As the housing is molded separately, the productivity can be increased and there by the cost of the component will be less.

Thus the invention provides for the required wheel hub mountable speed sensing device which would avoid the limitations and/or complexities of the presently available hub-mountable sensing devices by way of selective disposition of the sensing probe in relation to the rotor having sensing teeth for effective magnetic response based detection of speed and also providing simplicity and ease of application and maintenance of such speed sensor. The invention would facilitate the productivity of speed sensing devices including by way of reducing the cost of the components involved thereby enabling wide scale manufacture and use of the speed sensor device for automobiles and the like.

I claim:

1. A hub mountable speed sensing device comprising:
   a housing;
   a metallic tubular insert adapted for securely supporting thereon a rotatable metal wheel and also to be press fitted with respect to said housing;
   a stationary speed sensing/rotation detection probe comprising a magnetic conversion device having a bias magnet and adapted to be inserted into the housing in close proximity to said rotating metal wheel mounted on said metallic tubular insert and having sensing teeth along its axis made of ferrous material;
   a locking arrangement provided to prevent the said detection probe from dislodging from said housing; and
   wherein the said bias magnet is adapted to generate magnetic flux which is interrupted by the said teeth of said rotatable metal wheel while rotating and said magnetic conversion device providing for speed sensing based on the change in flux density; wherein
   a hub mountable speed sensing device comprising a circular opening along with a Key way slot provided on the housing and axis of the circular opening aligned such a way to position the Hall IC or the like tangentially to said rotor and a guide hole coaxially aligned to above said circular opening for correct alignment of over molded probe along the radial direction, said Key way slot of the circular opening providing for over molded probe alignment in axial direction.

2. A hub mountable speed sensing device according to claim 1 wherein the circular hole provided near the Key way slot and the hole axis is nearly perpendicular or slightly tilted from the perpendicular axis.

3. A hub mountable speed sensing device according to claim 1 wherein said locking arrangement comprises a groove provided on the tubular metal insert at the hub side and said rotor is inserted on the said tubular insert fitted with a locking device preferably selected from Circlip, Snap ring, Push on lock washer and the like such that the hub side movement of said rotor is arrested during shipment time itself.

4. A hub mountable speed sensing device according to claim 3 wherein the rotor is made of plastic resin material preferably nylon, Polyoxymethylene or like materials & insert molded with ferrous insert having sensing teeths along its axis.

5. A hub mountable speed sensing device according to claim 1 wherein the bias magnet is fixed by means of adhesive or an additional small housing made out of plastic resin which is moulded with a thermo plastic elastomer (TPE) or PVC or like material.

6. A hub mountable speed sensing device according to claim 5 wherein the over molding material provides total watertight sealing for the circuit board.

7. A hub mountable speed sensing device according to claim 6 wherein said over molded portion is having a pilot guide pin on front side inserted into the said guide hole and a rectangular projection provided on the body slides into the key way slot on the housing, a dowel pin or Light tension pin is press fitted into the circular hole after making a pilot drilling operation, which provides for a recess on the rectangular portion of over molded probe, the said dowel pin or light tension pin adapted to prevent the over molded probe dislodging from the housing.

8. A hub mountable speed sensing device according to claim 7 wherein the over molded probe fixed with housing and locked with a dowel pin or light tension pin is adapted for easy removal for inspection and/or replacement.

9. A hub mountable speed sensing device according to claim 8 wherein the housing is molded as a separate component without the metallic tubular insert and the tubular insert press fitted in a water-tight manner with housing.

10. A hub mountable speed sensing device comprising:
    a housing;
    a metallic tubular insert adapted for securely supporting thereon a rotatable metal wheel and also to be press fitted with respect to said housing;
    a stationary speed sensing/rotation detection probe comprising a magnetic conversion device having a bias magnet and adapted to be inserted into the housing in close proximity to said rotating metal wheel mounted on said metallic tubular insert and having sensing teeth along its axis made of ferrous material;
    wherein the said bias magnet is adapted to generate magnetic flux which is interrupted by the said teeth of said rotatable metal wheel while rotating and said magnetic conversion device providing for speed sensing based on the change in flux density; and
    the said probe is over molded and fixed with housing and locked with a dowel pin or light tension pin to on one hand prevent dislodging from the housing and also favour easy removal for inspection and/or replacement; wherein
    a hub mountable speed sensing device according to claim 2 comprising a circular opening along with a Key way slot provided on the housing and axis of the circular opening aligned such a way to position the Hall IC or the like tangentially to said rotor and a guide hole coaxially aligned to above said circular opening for correct alignment of over molded probe along the radial direction, said Key way slot of the circular opening providing for over molded probe alignment in axial direction.

11. A hub mountable speed sensing device according to claim 10 wherein the circular hole provided near the Key way slot and the hole axis is nearly perpendicular or slightly tilted from the perpendicular axis.

12. A hub mountable speed sensing device according to claim 10 wherein the bias magnet is fixed by means of adhesive or an additional small housing made out of plastic resin which is moulded with a thermo plastic elastomer (TPE) or PVC or like material.

13. A hub mountable speed sensing device according to claim 12 wherein the over molding material provides total watertight sealing for the circuit board.

14. A hub mountable speed sensing device according to claim 13 wherein said over molded portion is having a pilot guide pin on front side inserted into the said guide hole and a rectangular projection provided on the body slides into the key way slot on the housing, a dowel pin or Light tension pin is press fitted into the circular hole after making a pilot drilling operation, which provides for a recess on the rectangular portion of over molded probe, the said dowel pin or light tension pin adapted to prevent the over molded probe dislodging from the housing.

15. A hub mountable speed sensing device according to claim 14 wherein the over molded probe fixed with housing and locked with a dowel pin or light tension pin is adapted for easy removal for inspection and/or replacement.

16. A hub mountable speed sensing device as claimed in claim 15 wherein the housing is molded as a separate component without the metallic tubular insert and the tubular insert press fitted in a water-tight manner with housing.

* * * * *